United States Patent [19]

Holze, Jr.

[11] 4,315,181

[45] Feb. 9, 1982

[54] ULTRASONIC RESONATOR (HORN) WITH SKEWED SLOTS

[75] Inventor: Ernest P. Holze, Jr., Brewster, N.Y.

[73] Assignee: Branson Ultrasonics Corporation, New Canaan, Conn.

[21] Appl. No.: 142,739

[22] Filed: Apr. 22, 1980

[51] Int. Cl.³ .............................................. H01L 41/08
[52] U.S. Cl. ...................................... 310/323; 310/325
[58] Field of Search ................... 310/323, 325, 26; 74/1 SS; 228/1 R; 156/515; 51/59 SS, DIG. SS; 239/102; 425/174.2; 264/23

[56] References Cited

U.S. PATENT DOCUMENTS

| | | | |
|---|---|---|---|
| 3,113,225 | 12/1963 | Kleesattel et al. | 310/26 |
| 3,280,740 | 10/1966 | Balamuth et al. | 310/26 X |
| 3,601,084 | 8/1971 | Biro et al. | 310/323 X |
| 3,939,033 | 2/1976 | Grgach | 228/1 R X |
| 4,224,091 | 9/1980 | Sager | 228/1 R |

*Primary Examiner*—Mark O. Budd
*Attorney, Agent, or Firm*—Ervin B. Steinberg; Philip J. Feig

[57] ABSTRACT

An ultrasonic half-wavelength resonator characterized by an input surface and an output surface both being disposed at antinodal regions of the longitudinal vibratory energy travelling through the resonator and a medially disposed nodal region is provided with a plurality of slots disposed in the resonator extending from a region near the input surface to a region near the output surface and passing through the nodal region. The slots being angled relative to the longitudinal axis of the resonator from the input surface to the output surface to provide substantially uniform motion along the output surface of the resonator.

5 Claims, 3 Drawing Figures

ULTRASONIC RESONATOR (HORN) WITH SKEWED SLOTS

SUMMARY OF THE INVENTION

This invention relates to an ultrasonic resonator exhibiting substantially uniform motion along its output surface. The invention is particularly useful in ultrasonic welding of thermoplastic films where uniform motion along the entire output surface of the ultrasonic resonator is essential. The invention is not limited to ultrasonic welding of film material but has application also to welding of rigid plastics, staking or inserting processes involving thermoplastic material. Moreover, the invention has application in the field of ultrasonic liquid processing where a liquid or slurry is to be cavitated.

An ultrasonic resonator, also referred to as a mechanical amplifier or horn, is a contoured piece of material, usually aluminum, steel or titanium, dimensioned to be resonant as a half-wavelength resonator at a predetermined frequency. In the case of an ultrasonic resonator, the predetermined frequency is any frequency in excess of 10 kilohertz, although most usually at a frequency in the range between 20 and 60 kilohertz. An ultrasonic half-wavelength resonator is characterized by exhibiting an antinodal region of longitudinal motion at the input surface and at the output surface of the resonator and a medially disposed nodal region of longitudinal motion.

The design of ultrasonic resonators is described, for instance, in the book *Ultrasonics the Low- and High-Intensity Applications* by D. Ensminger, Marcel Dekker, Inc., New York, 1973, pages 123 to 148 and in the book *Ultrasonic Engineering* by J. R. Frederick, John Wiley & Sons, Inc., New York, 1965, pages 87 to 103.

It is well known in the art of ultrasonic resonator construction to design a resonator with longitudinal slots to decouple Poisson couplings. The slots are disposed parallel to the longitudinal axis of the resonator from the input surface to the output surface and traverse the nodal region of the resonator. The construction of slotted resonators is described in U.S. Pat. No. 3,113,225 issued to C. Kleesattel et al, dated Dec. 3, 1963 entitled "Ultrasonic Vibration Generator." While the longitudinal slots disposed parallel along the longitudinal axis of the resonator are used to decouple the Poisson couplings manifest in the resonator and, hence, to provide substantially uniform motion along the output surface, it has been found that the motion is not sufficiently uniform for all ultrasonic applications.

In U.S. Pat. No. 3,939,033 issued to F. J. Grgach et al, dated Feb. 17, 1976 entitled "Ultrasonic Welding and Cutting Apparatus" and assigned to the assignee of the present invention, several slotted resonator constructions are described and illustrated which reduce the amplitude of the output surface at its edge regions. The patent discloses notches disposed in the resonator input surface and slots in the output surface to cause uniform motion along the central region of the resonator output surface and to substantially reduce motion at the edges of the output surface which contact a bearing surface.

While the Grgach et al construction has met with success, it has been discovered that by further modifying the construction of slotted resonators it is possible to achieve substantially uniform motion along the entire resonator output surface.

To this end, the present resonator construction provides slots in the horn at an angle with respect to the longitudinal axis of the resonator and passing through the nodal region of the resonator. The slots are inclined toward the edges of the output surface at an angle of approximately five to ten degrees relative to the longitudinal axis of the resonator so that the lateral distance between a pair of slots increases in the direction toward the output surface. The observed effect of the angular slots is to decrease the motional amplitude of the resonator output surface in the center region between the slots and to increase the motional amplitude at the edge regions. By properly dimensioning the slots with regard to length, position and angle it is possible to achieve substantially uniform motional amplitude along the entire output surface of the resonator.

A principal object of the invention is, therefore, the provision of an ultrasonic half-wavelength resonator exhibiting uniform motion along its output surface.

Another object of the invention is the provision of an ultrasonic half-wavelength resonator having slots disposed at an angle with respect to the longitudinal axis of the resonator.

Further and still other objects of the invention will become more clearly apparent when the following specification is read in conjunction with the accompanying drawings.

DETAILED DESCRIPTION

Figure 1:
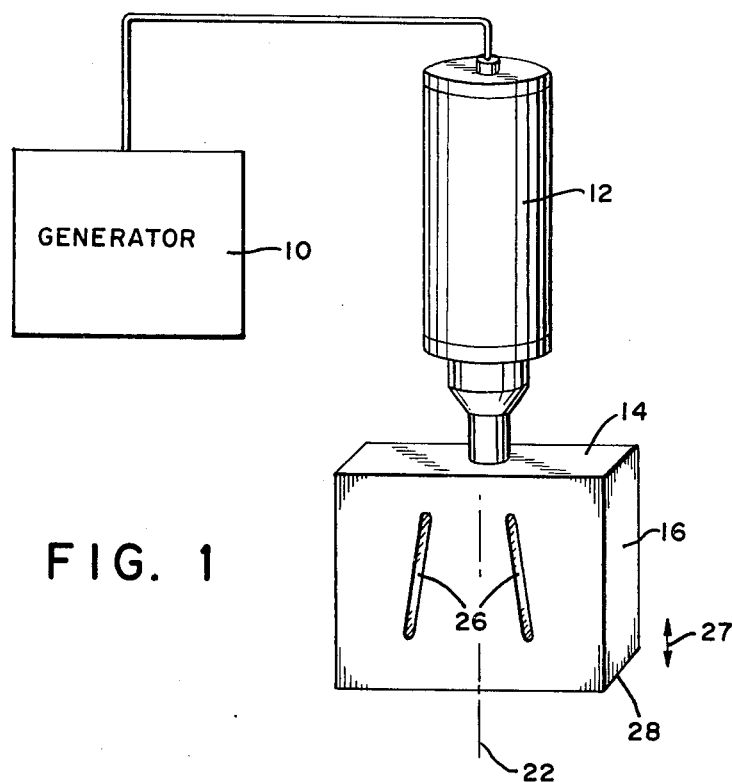
FIG. 1 is an elevational view of an ultrasonic half-wavelength resonator constructed in accordance with the teachings of the present invention.

Referring to the figures and in FIG. 1 in particular there is shown an ultrasonic half-wavelength resonator and a means for energizing the resonator. A half wavelength resonator is characterized by an antinodal region of longitudinal motion at both the input surface and the output surface and an intermediate nodal region of longitudinal motion. An electrical generator 10 converts line voltage to a predetermined high frequency electrical signal. The predetermined frequency is usually in the range between one and 100 kilohertz, preferably in the range between 20 and 60 kilohertz. The electrical signal from the generator 10 is provided to an electroacoustic converter 12 which converts the electrical energy applied at its input into mechanical vibratory motion of the predetermined frequency manifest at the output surface of the converter. The converter preferably is constructed in accordance with the teachings of U.S. Pat. No. 3,524,085 issued to A. Shoh, dated Aug. 11, 1970, entitled "Sonic Transducer." While the converter 12 is preferably an electroacoustic converter, a magnetostrictive converter could be likewise used.

Figure 2:
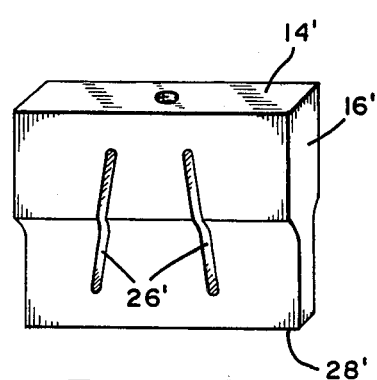
FIG. 2 is an elevational view of an alternative half-wavelength resonator constructed in accordance with the teachings of the present invention.

The output surface of the converter 12 is coupled to the input surface 14 of the half-wavelength resonator 16 by means of a threaded stud. The resonator 16 is dimensioned to be resonant as a half-wavelength resonator at the frequency of the mechanical vibratory energy applied from converter 12. The resonator 16 may have a uniform cross-section as shown in FIG. 1 or have a blade like cross-section exhibiting a reduced cross-section at the output surface as shown by resonator 16' in FIG. 2.

Figure 3:
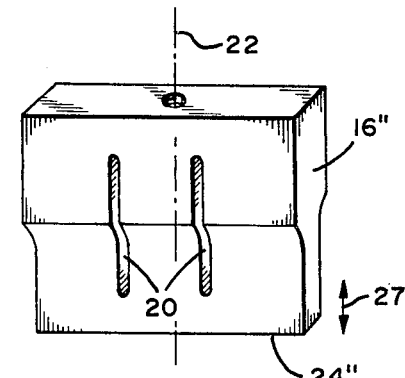
FIG. 3 is an elevational view of a prior art resonator.

In FIG. 3 a blade-shaped resonator constructed according to the prior art is shown. A pair of slots 20 are cut into the resonator 16" in a direction parallel to the vertical (longitudinal) axis 22 of the resonator 16". Using resonators constructed as shown in FIG. 3 has resulted in the motion of the output surface 24" in the direction of double-headed arrow 27 being non-uniform along the output surface 24". The lateral edges of the frontal surface 24" exhibit lower motional excursion than the central region.

In accordance with the teachings of the present invention slots 26 extending from a region near the input surface 14 to a region near the output surface 28 and passing through the nodal region are cut through resonator 16 at an angle with respect to the longitudinal axis 22 of the resonator. The slots are inclined from the center of the resonator toward the edges of the output surface. That is, the lateral distance between the pair of slots 26 increases toward the output surface 28. The longitudinal axis is defined as the direction of travel of the applied longitudinal vibrational energy from the input surface 14 to the output surface 28 of the resonator 16. The prefered angle is in the range between five and ten degrees. The effect of the inclined slots is to decrease the motional amplitude (gain) of the output surface 28 in the central region and to increase the amplitude at the lateral edge regions of the output surface 28. By properly dimensioning the length, width and location of the slots in addition to selecting the angle of the slots, the motional amplitude along the output surface 28 in the direction of the double headed arrow 27 will be substantially uniform across the entire surface 28. In the same manner slots 26' are cut through blade like cross-section resonator 16' at an angle with respect to the longitudinal axis of the resonator.

While there has been described a preferred resonator construction, modifications and variations may be made without deviating from the broad principle of the invention which shall be limited solely by the scope of the appended claims.

What is claimed is:

1. An ultrasonic resonator dimensioned to operate as a half-wavelength resonator at a predetermined frequency of sound travelling therethrough from an input surface to an oppositely disposed output surface and through a medially disposed nodal region, the improvement comprising: a pair of elongated slots disposed in said resonator and extending generally from a region near said input surface to a region near said output surface and passing through said nodal region, and said slots being angled relative to the longitudinal axis of said resonator from said input surface to said output surface to provide substantially uniform motion along said output surface of the resonator.

2. An ultrasonic resonator as set forth in claim 1, said slots being angled so that the lateral distance between the slots increases in a direction toward said output surface.

3. An ultrasonic resonator as set forth in claim 2, said slots being angled relative to the longitudinal axis in the range between five and ten degrees.

4. An ultrasonic resonator as set forth in claim 2, said resonator having a uniform cross-section.

5. An ultrasonic resonator as set forth in claim 2, said resonator having a non-uniform cross-section.

* * * * *